Figure 6:
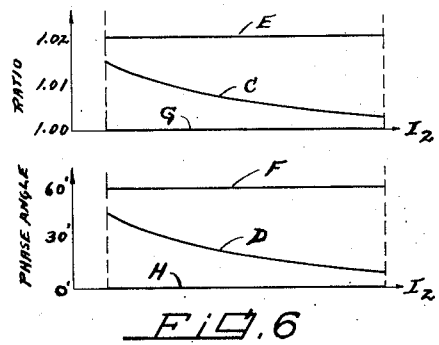

June 21, 1932.                A. C. SCHWAGER                1,863,936
TRANSFORMER SYSTEM AND APPARATUS
Filed July 6, 1931        2 Sheets-Sheet 1
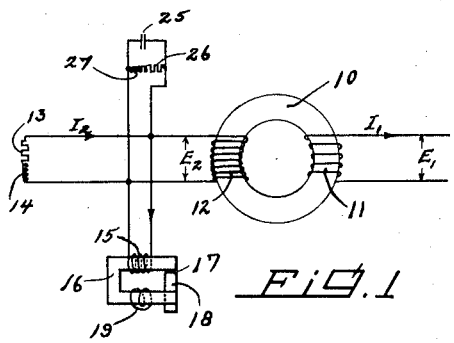
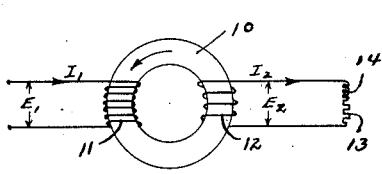
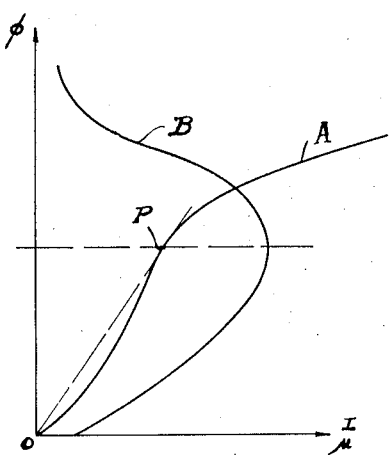
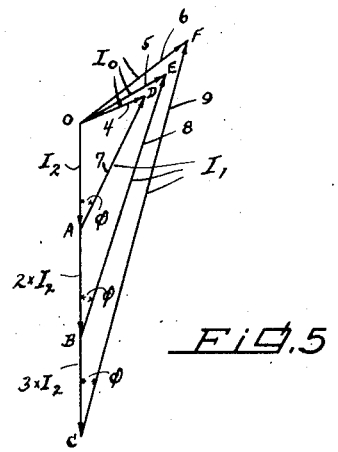
INVENTOR.
AUGUST C. SCHWAGER
BY Wm. H. Atkinson
ATTORNEY June 21, 1932.   A. C. SCHWAGER   1,863,936
TRANSFORMER SYSTEM AND APPARATUS
Filed July 6, 1931   2 Sheets-Sheet 2

INVENTOR.
AUGUST C. SCHWAGER
BY
ATTORNEY

Patented June 21, 1932

1,863,936

UNITED STATES PATENT OFFICE

AUGUST C. SCHWAGER, OF SAN FRANCISCO, CALIFORNIA

TRANSFORMER SYSTEM AND APPARATUS

Application filed July 6, 1931. Serial No. 548,900.

The present invention relates to an electric transformer and reactor system which will effect a correction of the current ratio and the phase angle between the primary and secondary currents. The invention is more particularly adapted to current transformers, used for operating electrical measuring instruments, such as ammeters, wattmeters, and watthour meters, as well as relays, trip coils of circuit breakers, etc. The invention, however, is not limited in its application to current transformers but is generally applicable to all transformers where it is desired to control the ratio of the secondary current to the primary current, or the time-phase angle between these currents, or both ratio and time-phase angle. Since the current transformer is one of the commonest pieces of apparatus to which my invention is applicable, and in connection with which it may be readily understood, I shall describe my invention as applied to such a transformer.

The current transformer as ordinarily used for the above mentioned purposes consists essentially of a core of magnetic material, usually of iron or an alloy consisting largely of iron, on which are wound two coils of insulated wire or their electrical equivalent. One of these coils, usually of a few turns of large wire, is connected in the primary or line circuit, which is usually of high voltage, and the other coil, usually of a larger number of turns of smaller wire, supplies a secondary induced current which passes through and operates the electrical measuring instruments and controlling devices connected in the secondary circuit. In current transformers as so constructed, the ratio of the two currents varies with changes in the magnitude of the secondary current. Also, the electrical phase difference between the primary current and the secondary current, which would be exactly 180 degrees in an ideal transformer, departs from 180 degrees by a small angle, the "phase angle", which varies with changes in the magnitude of the secondary current. For the accurate operation of electrical measuring instruments, especially wattmeters and watthour meters, it is necessary that the ratio and the phase angle be very nearly constant for all operating conditions of secondary current, and that the phase angle should be quite small to avoid errors in measuring loads of low power factor.

I am aware that transformers of various designs have been provided for the elimination of the ratio and phase angle errors, but in each instance the correction is only partially effected as the errors have not been completely eliminated.

In the patent to Brooks #1,357,197 dated October 26, 1920, there is shown an arrangement of an electric transformer system which operates on the multiple stage principle to automatically maintain a constant and correct ratio of current and to minimize the phase angle. (See page 1, lines 106 to 111 of this patent.) This disclosure requires a special transformer construction, whereas in my invention any standard transformer can be corrected without structural changes being made therein.

In the patent to Wilson #1,722,167 dated July 23, 1929, there is illustrated and described a current transformer having two core sections arranged to conduct the magnetic flux in parallel paths. An auxiliary winding is wound upon one of said sections and operates to unbalance the flux density in the two sections so that, as stated in this patent, a substantial correction is effected in the ratio and phase angle errors. The core of the Wilson transformer is shown as having a saturated portion in the core about which the auxiliary winding carrying the secondary current is disposed. In this invention the flux of the core is unbalanced and a leakage is produced, whereas in my invention the flux of the transformer core is not disturbed nor is there any magnetic connection between my correcting reactor core and the transformer core proper.

The closest art with which I am familiar is disclosed in the patent to Pfeffner #1,731,865 dated October 15, 1929. In this patent the main transformer core is described as having a magnetically saturated iron path and an air-gap disposed parallel in the magnetic circuit for obtaining proportionality between the magnetization and the induction. My present improvement differs structurally from the Pfeffner transformer in that no modification need be made in the main transformer core. In this patent it is stated that the ratio and phase angle deviations are reduced to a minimum. (See page 1, lines 57 to 60 inclusive of this patent.) From this last statement it is evident that the correction effected is not complete.

In accordance with my invention I correct the current ratio and phase angle between the primary and secondary currents of a transformer to constant values, independent of the secondary current value, by providing an auxiliary reactor for obtaining linearity between the exciting current of the transformer with the reactor and the remaining variables of the circuit of the transformer.

In the preferred embodiment of my invention I propose to connect an auxiliary reactor in shunt across any desired voltage of the transformer, for instance across the secondary voltage. This reactor may be termed a deficiency reactor and is designed to operate so that the vector sum of its exciting current plus the exciting current of the main transformer will increase in direct proportion with the flux of the main transformer core.

One way in which I accomplish the above is to provide an auxiliary reactor having an open or constricted core that operates at high saturation and carries a winding upon which a voltage of the transformer to be corrected can be impressed.

For a better understanding of my invention reference should be had to the accompanying drawings wherein I have shown a preferred construction and illustrated by curves and vector diagrams the principles of operation.

Figure 7:
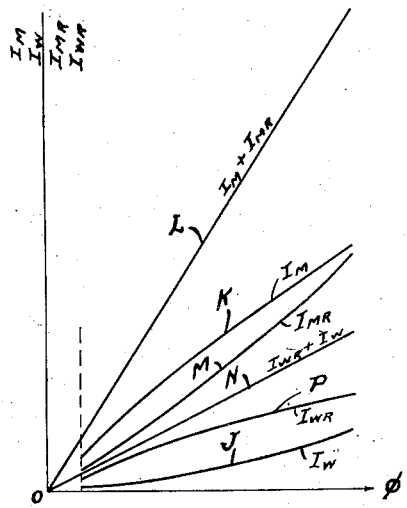
Figures 9, 10:
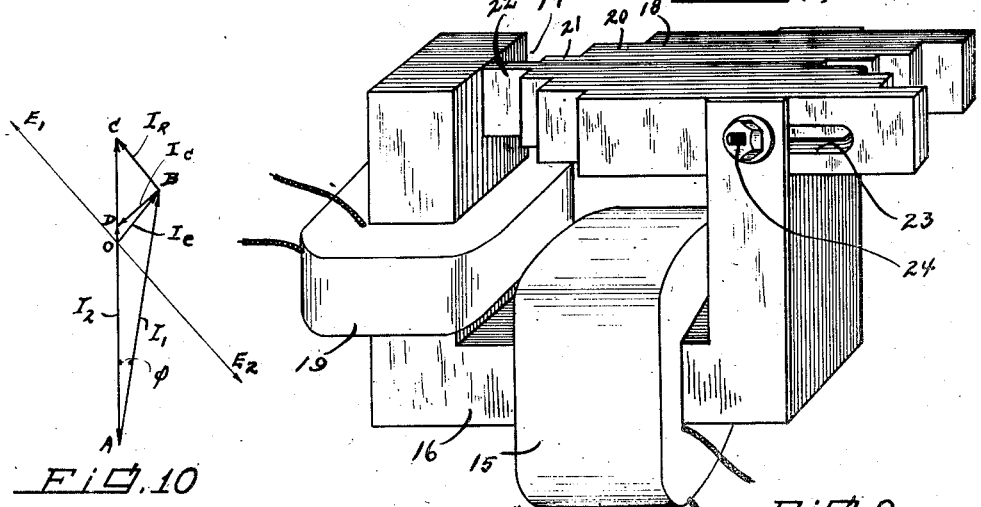
Figure 8:
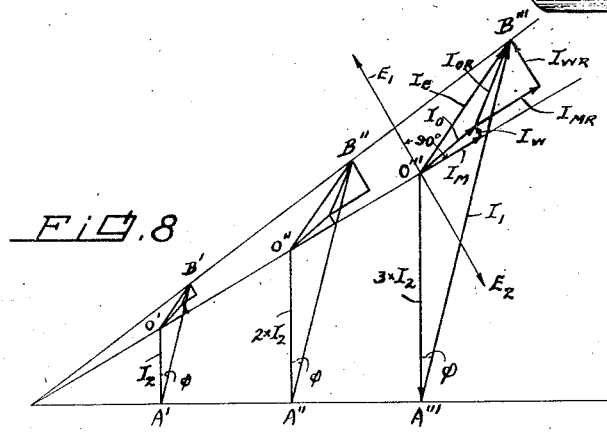

In the drawings:

Figure 1 is a schematic wiring diagram showing an arrangement of apparatus as contemplated by my invention, Figure 2 is a diagram of a simple transformer, Figure 3 is a vector diagram representing the characteristics of the transformer illustrated in Figure 2, Figure 4 shows the permeability and magnetization curves of a transformer, Figure 5 shows a series of vector diagrams for a simple transformer with three different burdens, Figure 6 shows various ratio and phase angle curves, Figure 7 shows additional curves which illustrate the principles of my invention, Figure 8 shows a series of vector diagrams for a transformer equipped with my invention, Figure 9 is a perspective view showing one form of a reactor built in accordance with my invention, and Figure 10 is a vector diagram of a transformer equipped with my improvement and having phase angle correction features.

In Figure 1 of the drawings I have shown a simple wiring diagram in which my improvement is applied for the purpose of correcting the phase angle and ratio errors of a simple transformer. In this figure of the drawings 10 designates the usual closed magnetic core of a transformer. Disposed upon the core 10 there is a primary winding 11 and a secondary winding 12. A burden consisting of resistance 13 and inductance 14 is shown as connected to the secondary winding 12. This burden may be meters, relays or other electrical apparatus. Connected across the terminals of the secondary winding 12 is a winding 15 which forms a part of my improved reactor. The winding 15 is disposed about a portion of a suitable magnetic core 16 which is partly or completely interrupted by an air-gap 17. The air-gap 17 and an adjacent leg 18 of the core 16 are made adjustable so that various degrees of saturation can be obtained at this point. The core 16 may also be provided with a short circuited winding 19 when conditions, as will hereinafter appear, warrant the use of such a coil.

It is well known that a current transformer is generally used to transform the current of one circuit to a second circuit at the same or a different value. Under these conditions it is desirable that the ratio of transformation between the two currents remain constant and the phase displacement be zero. Such a transformer, however, will not effect a transformation of current from one circuit to another over a varying range of current without the introduction of a variation in the ratio and phase displacement of the current. The reason for this error is explained by the fact that under varying secondary currents and flux the transformer requires non-proportionately varying values of exciting current which must be supplied by the primary winding. In accordance with my invention, I propose to correct these errors in ratio and phase angle by operating my correcting reactor with a highly saturated core so that it will draw a current from the secondary circuit which will supplement the exciting current used by the transformer and produce linearity with the flux.

In order to more fully explain the theory of my invention, I have prepared a series of vector diagrams and curves which will now be referred to. I shall first discuss the conditions which exist in a simple transformer of the type schematically illustrated in Figure 2 of the drawings.

The vector diagram for a simple transformer is shown in Figure 3. For the purpose of discussing this diagram it will be assumed that the primary and secondary windings each have one turn. By this assumption nothing of the generalities of the following discussion will be lost.

In this diagram the secondary current $I_2$ is produced by the secondary induced voltage $E_2$ which in turn is induced by the flux $\phi$. This flux $\phi$ leads the voltage $E_2$ by 90°. Under these conditions, $I_2$ is directly proportional to $E_2$ and thus also to the flux $\phi$.

In such a transformer the magnetic core 10 for each value of flux $\phi$ will require a definite amount of magnetizing current $I_m$ which will be in phase with it. This magnetizing current $I_m$ is supplied by the primary voltage $E_1$ and lags it 90°.

By referring to Figure 4 which shows an alternating current magnetization curve "A" and a curve "B" for the apparent permeability $\mu$, it will be seen that the saturation point "P" on the magnetization curve corresponds to the point of maximum value on the permeability curve "B". It will be also noted that all points below the saturation point "P" correspond to points on the increasing part of the permeability curve and that all points above "P" correspond to the decreasing part of the permeability curve.

When the core of the transformer, as represented by the vector diagram in Figure 3, is energized with the alternating current there will be certain hysteresis and eddy current losses. As a result of this condition a watt current $I_w$ must be furnished by the voltage $E_1$, this current being in phase with its voltage. The total current necessary to produce the flux $\phi$ will thus be equal to the vector sum of $I_w$ plus $I_m$ and may be illustrated as $I_o$. This latter current $I_o$, commonly known as the exciting current of the transformer, as shown in Figure 3, comprises the watt current $I_w$ and the magnetizing current $I_m$. The values $I_w$ and $I_m$ do not vary proportionately with the flux of the transformer and consequently, since varying currents on the transformer will effect the flux, these values will also vary. The effect of this variation or non-linearity between the magnetizing current $I_o$ and the flux may be illustrated by the following:

In Figure 5, I have illustrated, in superimposed relation, three vector diagrams for a transformer having secondary current values of one, two and three or some multiple thereof. In these triangles the magnetizing currents $I_o$ are represented by the vectors four, five and six and the primary currents $I_1$ are represented by the vectors seven, eight and nine, respectively. From these triangles it will be seen that when the secondary current $I_2$ increases from one to two or from two to three, the exciting current of the transformer does not proportionally increase, otherwise, the triangles OAD, OBE and OCF would be similar and the phase angles $\theta$ as well as the ratio of transformation $\dfrac{I_1}{I_2}$ would remain the same and constant.

In Figure 6 of the drawings, the curves C and D are respectively typical ratio and phase angle errors for a transformer of the above type. In this figure of the drawings the curves E and F illustrate respectively the ratio and phase angle corrections effected by my present improvement.

In Figure 7, I have illustrated by curves the normal values of the magnetizing current component $I_m$ and the watt component $I_w$ for a predetermined magnetizing current $I_o$ for the main transformer core.

In this diagram the curve K represents the variations in the magnetizing current component $I_m$ for a certain magnetizing current $I_o$ and the curve J represents the variations in the watt component $I_w$ for the same magnetizing current.

It is obvious that under these conditions the magnetizing current $I_o$ which is equal to the vector sum of the magnetizing current component $I_m$ and the watt component $I_w$ will vary in non-linear relation with the flux $\phi$.

If linearity is to be obtained between the magnetizing current $I_o$ and the flux it will be seen that my reactor will need to draw a current $I_r$ which consists of a magnetizing component $I_{mr}$ and a watt component $I_{wr}$. Linearity will then exist between the flux $\phi$, the sum of the magnetizing components $I_m$ and $I_{mr}$ and the sum of the watt components $I_w$ and $I_{wr}$.

If curve L of Figure 7 is assumed to be a straight line for the total magnetizing current, then it will be evident that my reactor will need to draw a current corresponding to curve M which is obtained by subtracting curve K from curve L.

Similarly, if curve N is assumed to be a straight line for the total watt current components $I_w$ and $I_{wd}$, then it will also be evident that the reactor must draw a watt current corresponding to curve P which is obtained by subtracting curve J from curve N.

To illustrate the above, I have shown in Figure 8 three complete vector diagrams for a transformer and reactor operating in accordance with my invention.

In these diagrams, like those of Figure 5, I have represented secondary current values of 1, 2 and 3 or multiples thereof. These diagrams illustrate completely the relations between the various components and show plainly the similarity in the triangles O' A' B', O'' A'' B'' and O''' A''' B'''. From these diagrams it will be seen that due to the similarity of the various components the phase angle $\theta$ and the ratio $\dfrac{I_1}{I_2}$ are constant.

I shall now describe the construction of a deficiency reactor for drawing such current values as are illustrated by curves M and P of Figure 7 when energized by the secondary voltage $E_2$ of a transformer.

The curve M which represents the magnetizing current $I_{mr}$ of the reactor will be considered first. It is seen that this current increases more than proportionately with the flux $\phi$ of the transformer core and thus also with $E_2$ as the curve is convex in regard to the $\phi$ axis.

By referring to the magnetization curve A in Figure 4, it will be seen that the magnetizing current for magnetizing a core above the saturation point increases more than proportionately with the flux, as the curve above the point P is convex with regard to the $\phi$ axis.

A closed magnetic core energized from the secondary voltage $E_2$ above the knee of the saturation curve for all values of $\phi$ in the main core will thus draw a current which will have the characteristics of curve M in Figure 7.

The application of a simple reactor will greatly flatten the ratio and phase angle curves and can thus be considered a useful application. The current drawn by a closed saturated core, however, will not exactly coincide with the curve M. A much closer coincidence can be obtained if the saturated reactor core is interrupted by an air-gap. Perfect coincidence on the other hand can be obtained if the saturated core consists of various sections, each of which work on a different range above the knee of the saturation curve. This is accomplished by providing sections of different cross-section and interrupting some or all of the sections by an air-gap of proper dimension.

Since a considerable number of ampere turns are required to saturate the parts of the reactor core to various densities, it is advisable to apply the necessary ampere turns to a core of large cross-section working at a low flux density which will carry the flux to the various core sections to be saturated, some of which may be in series with an air-gap. The exciting current of that part of the core which works at low flux density is small compared to that drawn by the saturated part and can thus be easily taken care of.

Figure 9 shows one form of the construction for the reactor. In this figure of the drawings 16 is the part of the core which works at a low flux density. The exciting winding 15 is shown upon this part of the core 16. The saturated leg of the core designated by the numeral 18 is provided with an adjustable air-gap 17. The saturated portion of the core 16 is shown as composed of one or more laminations of steel of the same or different quality and length as those making up the rest of the core. These laminations are made adjustable with respect to each other so that the portion 18 of the core 16 can be formed to have portions of different cross-section which will be in series with air-gaps of different lengths. As illustrated the ends of the laminations may be staggered with respect to each other so as to provide a portion 20 of one cross-section and portions 21 and 22, etc. of different cross-sections. Under some conditions it may be desirable to completely close the air-gap 17 with some of the laminations at this point.

Since the dimensions of the saturated portions of the cores and their air-gaps are of primary importance, means of easily adjusting these cores are necessary. One method of accomplishing this is to provide slots 23 in the laminations through which a tightening bolt 24 may pass. Numerous other methods of arranging and adjusting the saturated parts of the core are also possible.

As shown in Figure 8, the magnetizing current vector $I_{mr}$ of the reactor with properly adjusted laminations will coincide with the curve M in Figure 7 and thus bring the magnetizing current $I_m$ of the main transformer core up to linearity.

Since the magnetizing current $I_m$ of the main core is large compared to the watt current $I_w$ almost constant ratio and phase angle is obtained.

To get perfect proportionality the watt current $I_w$ of the main transformer core, curve J in Figure 7, must be brought up to linearity as shown by curve N. This can be accomplished by adding an auxiliary watt current $I_{wr}$ as shown by curve P to curve J.

In the art it is well known that a short circuited transformer with a small resistance burden will draw practically only a watt current on the primary side. If the core of this transformer works below the saturation point of its magnetization curve, then its primary current will increase less than proportionally with the flux and a curve similar to the curve P of Figure 7 can be obtained by proper selection of the core, primary winding and secondary winding. Such a short circuited transformer can be put across any desirable voltage, as for instance the secondary voltage $E_2$ of the transformer.

A simplification in the use of such a transformer can be obtained if this short circuited transformer winding 19 is incorporated with my magnetizing current reactor, as shown in Figures 1 and 9. The short circuited resistance winding 19 is preferably wound upon an unsaturated region of the core 16. This combination will bring the total exciting current $I_o$ of the main transformer core up to proportionality by drawing a current corresponding to the vector $I_{or}$ and will result in a total exciting current as indicated by the vector $I_e$ in Figure 8.

From the above it will be seen that the application of my reactor to a transformer core will produce a constant ratio and phase angle over the normal operating range, as indicated by curves E and F of Figure 6.

To make the transformer a perfect transformer, however, the ratio should be brought to a definite value and the phase angle should be reduced to zero.

This can be accomplished by means already known in the art and consists in shunting a capacitance 25, a resistance 26, and a reactance 27 or combinations thereof across the desired voltage, for instance across the secondary voltage $E_2$ of the transformer, as indicated in Figure 1.

Should it be desired to apply a capacitance 25, as illustrated in Figure 1, to a transformer system in which voltage $E_2$ is low, it would be desirable, in order to reduce the size of the condenser required, to connect the condenser to the winding of the transformer through a step-up transformer. Such an arrangement would greatly increase the voltage $E_2$ applied to the capacitance 25 and thus permit the use of a comparatively small condenser.

This same result may also be obtained with my improved device by treating the short circuited winding 19 on the reactor core 16 as a transformer secondary winding and connecting the capacitance 25 thereto.

Under these conditions my reactor will not only function as a reactor but also as a transformer in connecting the capacitance 25 to the apparatus being corrected.

If a resistance of proper value is shunted across $E_2$, as illustrated in Figure 1, the primary current $I_1$ represented by the vector AB in Figure 10, including the angle $\theta$ with the secondary current OA, is supplemented by the current $I_r$ and its resulting vector sum AC then becomes parallel with OA. Parallelism between the primary and secondary currents can also be obtained by the use of a capacitance, as is illustrated in Figure 10. In this instance the capacitance draws a current $I_c$, as represented by the vector BD, and produces a resulting primary current vector AD. In both cases a zero phase angle is obtained and the resulting phase angle error curve will correspond to curve H in Figure 6.

The adjustment of the ratio to any desired value may still be obtained by turn compensation. This consists in adjusting the ratio of the number of primary turns to secondary turns to the desired value. When the turns are thus adjusted the ratio error can be reduced to zero as shown by curve G in Figure 6.

Due to the fact that the exciting current at high saturation is very large compared to that at low inductions, the weight of the reactor core will be many times smaller than the weight of the main core. In most practical cases it will be less than 1% in weight. This feature makes my reactor easily applicable to any core without difficulty and at extremely low expense.

While the arrangement shown in Figure 9 represents the most practical solution for obtaining proportionality between $I_2$, $I_o$, $\phi$ and $I_1$, various alternatives and combinations are naturally possible and are within the scope of this invention.

In the foregoing description the winding of my improved reactor has always been placed across the voltage $E_2$, however, since $I_2$, $\phi$, $E_1$ and $I_1$ vary in direct proportion with $E_2$, it will be evident that the winding 15 can be placed also in series with the primary or secondary currents $I_1$ and $I_2$ or it may be connected across the primary voltage. It would also be possible to excite the winding 15 from a tertiary winding upon the main transformer core.

It is also possible to use two or more deficiency reactors to bring the main core exciting current $I_o$ to proportionality. Furthermore two or more cores can be brought to proportionality by use of a single reactor. A particular application is in the bushing type current transformer of an oil circuit breaker, where two separate transformers of the same phase can have their secondary windings connected in series or parallel.

The use of an auxiliary reactor for obtaining linearity between the magnetizing current and the remaining variables of the circuit of a current transformer with its resulting ratio and phase angle corrective ability has been outlined above. This invention, however, is not limited to this application, as ratio and phase angle errors which are not due to this improportionality but which are due to other causes can also be corrected by the use of this reactor.

In a potential transformer the ratio and phase angle between primary and secondary voltage vary with changes in external burden and voltage. Since the voltage ratio increases with increasing secondary burden and primary voltage a reactor having a core working substantially on the increasing part of the permeability curve will effect correction.

This reactor cannot only be applied where the high tension windings of the potential transformer are directly connected to the voltage to be measured but also to a potential transformer used in series with a capacitance, as is provided in a coupling condenser or a capacitance plate bushing.

In the same manner the cores of relays, meters and other instruments and devices can be brought up to a linear flux and exciting current relation.

In conclusion it should be stated that the cores of these devices do not have to be necessarily closed as in an ordinary transformer and that they can be of any shape and include air-gaps in parallel or in series with the cores or combinations thereof.

While I have, for the sake of clearness and in order to disclose my invention so that the same can be readily understood, described and illustrated specific devices and arrangements, I desire to have it understood that this invention is not limited to the specific means disclosed but may be embodied in other ways that will suggest themselves, in view of this broad disclosure, to persons skilled in the art. It is believed that this invention is broadly new and it is desired to claim it as such so that all such changes as come within the scope of the appended claims are to be considered as part of this invention.

Having thus described my invention, what I claim and desire to secure by Letters Patent is—

1. A deficiency reactor for correcting to a constant value the errors of a transformer caused by variable phase angle and magnetizing current values resulting from a change in current, comprising a reactance winding adapted to be connected electrically with the transformer, said reactance winding being disposed upon a separate core magnetically insulated from the transformer core and having a portion of reduced cross-section working at high magnetic saturation.

2. A deficiency reactor for correcting to a constant value the errors of transformation in a transformer caused by variable magnetizing currents resulting from a change in current, comprising a winding adapted to be connected electrically with one of the windings of the transformer, and a magnetic core magnetically insulated from the transformer upon which said winding is mounted having a portion working at high magnetic saturation.

3. A deficiency reactor for correcting variable phase angle and magnetizing current values of a transformer to values proportional to the transformer flux, comprising a winding adapted to be connected electrically with the transformer, and a magnetic core magnetically insulated from the transformer with which said winding cooperates, said magnetic core having portions working at different degrees of magnetic saturation.

4. A device for producing corrective current components complementary to the magnetizing and watt current components of a transformer exciting current, comprising a reactor having a magnetic core disposed out of magnetic relation with the transformer, and a winding connected electrically with one of the windings of the transformer.

5. A device for producing corrective current components complementary to the magnetizing and watt current components of a transformer exciting current, comprising a reactor having a magnetic core disposed out of magnetic relation with the transformer, and a winding connected electrically with one of the windings of the transformer, said magnetic core having an adjustable air-gap whereby the phase angle and magnitude of said corrective current components may be varied.

6. A device for producing corrective current components complementary to the magnetizing and watt current components of a transformer exciting current, comprising a reactor having a magnetic core disposed out of magnetic relation with the transformer, and a winding connected electrically with one of the windings of the transformer, said magnetic core having a portion of large cross-section for operating at low magnetic saturation and a portion of smaller cross-section operating at a higher degree of saturation.

7. In a deficiency reactor of the character described, a core comprising a laminated structure of magnetic material having laminations which can be adjusted and secured in different staggered positions with each other to provide portions of varying cross-section in the magnetic circuit of the core.

8. A core for a deficiency reactor of the character described, comprising a laminated structure of magnetic material having laminations which can be adjusted and secured in different staggered positions with each other to provide portions of varying cross-section and air-gaps of different lengths in series with said portions in the magnetic circuit of the core.

9. An electric transforming system for producing secondary currents having constant ratio and phase angle errors as distinguished from one producing secondary currents in which the ratio and phase angle errors vary, comprising a magnetic core having a primary and secondary winding disposed in inductance relation with each other, and a second magnetic core out of magnetic relation with said first core having a winding disposed thereupon and connected with one of the windings of said first core.

10. An electric transforming system for producing secondary currents having constant ratio and phase angle errors as distinguished from one producing secondary currents in which the ratio and phase angle errors vary, comprising a magnetic core having a primary and secondary winding disposed in inductance relation with each other, and a second magnetic core out of magnetic relation with said first core having a winding disposed thereupon and connected with one of the windings of said first core, said second magnetic core having a portion working at high magnetic saturation whereby it will operate on the decreasing portion of the permeability curve.

11. A deficiency reactor for supplying corrective current components complementary to the magnetizing and watt current components of a transformer exciting current, comprising an independent magnetic core having a portion of large cross-section operating at a low flux density and another portion of smaller cross-section in series with said first portion operating at a high flux density, and an exciting winding upon said core connected with a winding of the transformer.

12. A deficiency reactor for producing corrective current components complementary to the magnetizing and watt current components of a transformer exciting current, comprising a magnetic core having a winding in circuit with the transformer upon a portion operating at a low flux density and another portion of said core having a lesser cross-section to produce a high degree of saturation in this latter part of said core, and a short circuited winding upon said magnetic core.

13. A deficiency reactor of the type contemplated by the preceding claims for correcting transformer errors, comprising a laminated structure of magnetic material having laminations which can be adjusted and secured in different staggered positions with each other to provide portions of varying cross-section in the magnetic circuit of the core, a winding upon said core adapted to be electrically connected to a transformer circuit, and a short circuited winding upon said core in inductive relation with said winding.

14. A deficiency reactor of the character described, comprising a laminated core of magnetic material forming a magnetic circuit having portions of different cross-section, an exciting winding upon said core, and means for changing the cross-section of said portions, whereby the winding disposed upon said core will draw a magnetizing current which increases more than linearly with its terminal voltage.

15. A deficiency reactor for supplying corrective current components complementary to the magnetizing and watt current components of a transformer exciting current, comprising a magnetic core magnetically insulated from the transformer core having a portion of large cross-section working at a low degree of saturation and another portion of lesser cross-section in series working at a high degree of saturation, and a reactance winding connected with a winding of the transformer disposed upon said magnetic core.

AUGUST C. SCHWAGER.